P. H. THOMAS.
STARTING DEVICE FOR VAPOR CONVERTERS.
APPLICATION FILED MAY 11, 1905.
937,971.   Patented Oct. 26, 1909.
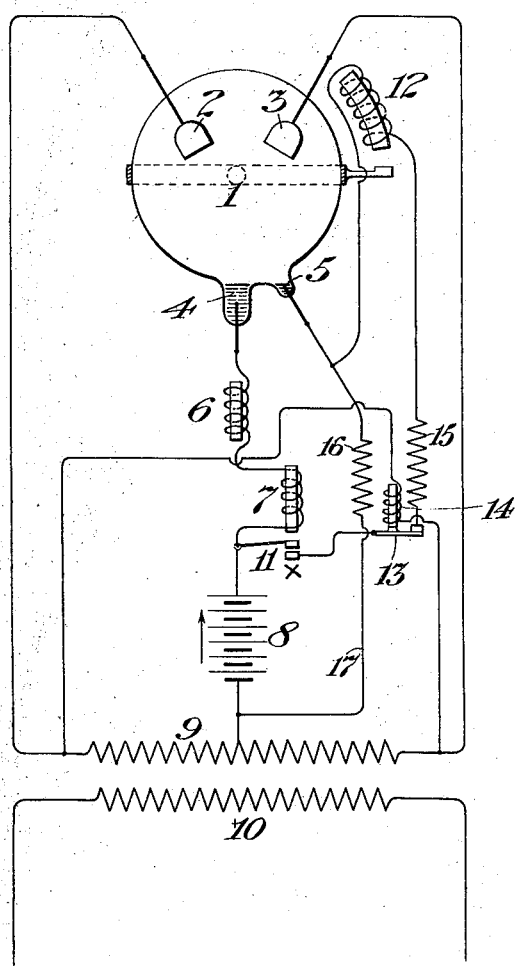

UNITED STATES PATENT OFFICE.

PERCY H. THOMAS, OF MONTCLAIR, NEW JERSEY, ASSIGNOR TO COOPER HEWITT ELECTRIC COMPANY, OF NEW YORK, N. Y., A CORPORATION OF NEW YORK.

STARTING DEVICE FOR VAPOR-CONVERTERS.

937,971.      Specification of Letters Patent.      Patented Oct. 26, 1909.

Application filed May 11, 1905. Serial No. 259,956.

*To all whom it may concern:*

Be it known that I, PERCY H. THOMAS, a citizen of the United States, and resident of Montclair, county of Essex, State of New Jersey, have invented certain new and useful Improvements in Starting Devices for Vapor-Converters, of which the following is a specification.

It has been proposed to start vapor converters such as are exemplified by the well-known mercury vapor converter, by means of a storage battery acting through metallic contacts which are brought together and separated within the converter. This starting has usually been done by hand and the connection has been made by the use of a reversing switch which originally connects the storage battery in one direction through the apparatus and afterward reverses the connections. In the present instance I cause no reversal of the polarity of the storage battery, but depend upon connections which will be fully described in the present specification.

The drawing herewith is a diagram of circuits and apparatus which may be used in carrying out my invention.

In the drawings, 1 is the container of a mercury vapor converter, 2 and 3 are positive electrodes of solid material therein, and 4 is the main negative electrode of the apparatus, 5 being a supplemental electrode therefor.

To the negative electrode 4 I join a conductor including an inductance, 6, leading through a magnet, 7, to one pole of a storage battery, 8, the opposite pole of which is joined to an intermediate point of the secondary, 9, of a transformer having a primary, 10. The terminals of the secondary 9 are joined to the positive electrodes 2 and 3. Between the storage battery 8 and the magnet 7 I arrange a cut-out, 11, capable of being operated by the said magnet; and I also provide a tilting magnet, 12, both the tilting magnet and the cut-out being included in a circuit including the battery 8 and a resistance, 16, and shunting the supplemental electrode 5.

Between the terminals of the secondary 9 I may place a coil, 14, adapted to operate a switch, 13, included in the circuit leading from one side of the battery 8 to the tilting magnet 12. In the last described circuit I may also include a resistance, 15.

The operation of the described organization is as follows: When the alternating current circuit leading to the primary 10 is closed, and the secondary 9 is excited, the coil 14 will be energized and thus close the switch 13. Current from the storage battery 8 will then pass by way of the switch 13, the resistance 15 and the coil 12 to the opposite pole of the storage battery, causing the container 1 to be tilted until the mercury at 4 connects with the mercury at 5. This action closes a shunt circuit to the coil 12 through the magnet 7, the inductance 6, the electrodes 4 and 5 and the resistance 16, deflecting the current from the coil 12 and allowing the container to fall back, thus breaking contact between the electrodes 4 and 5. This causes the direct current from the battery 8 to pass through the vapor from 4 to 5, the latter being temporarily the negative electrode.

During the first alternation, the electrodes 2 and 3 pass current through the converter by way of the electrode 5 and through the battery 8 and the shunt thereto according to the well-known principle of the single-phase vapor converter. It is evident, now, that were the negative electrode starting resistance of the negative electrode 4 broken down that current would flow from the positive electrode 2 and 3 from the alternating current source through the negative electrode 4 and the battery 8, charging it in the normal manner. Consequently, the voltage relation between the counter electro-motive-force of the battery 8 and the alternating current supply must be such that current cannot flow from the battery into the container. For this reason, the direct current which the battery initially caused to flow from the electrode 4 to the electrode 5 is suppressed the instant the breaking down of the negative electrode resistance of the supplemental electrode 5 permits voltage from the alternating current mains to be impressed upon the battery. Current flows, however, through coil 12 again, causing a second tilting of the container until a bridge of mercury is again formed between the electrodes 4 and 5 whereupon the current which has been passing out of the electrode 5 divides as between the two electrodes 4 and 5, as in any divided metallic circuit. The magnet 12 will, however, again be deenergized as before, the converter will fall back to normal position, and the mercury electrodes will be again separated whereupon the electrode 4 becomes the true negative electrode, starting the operation of the converter through the normal course by way of electrode 4, coils 6 and 7 and battery 8 to the secondary 9 or other source. In other words, at the instant when the electrodes 4 and 5 are in electrical connection within the container the second time, the current flowing has a choice of two paths having a common origin in the point at which the current from the positive electrodes 2 and 3 enters the combined electrodes 4 and 5. A portion of the current will evidently flow through one path out through the lead of the electrode 5, ultimately reaching the common point of the battery 8 and the transformer secondary 9 or through the other path through the lead of the electrode 4 ultimately reaching the same point. The relative amounts of current in the two paths will be determined by the external circuit relations. When, however, the electrodes 4 and 5 are separated within the container, if the negative electrode spot is upon 4 this electrode is properly established as the operating negative electrode. If the negative electrode spot, after separation, is upon the supplemental electrode 5, the current which at the instant before the separation was passing from the negative electrode spot on 5 through the conducting liquid of the electrode out through the lead of the electrode 4, must after the separation flow through the vapor space, in which act it puts into operative condition the negative electrode 4 and allows it to receive current normally from the positive electrodes 2 and 3. After this operation is completed a current will normally cease in the electrode 5 either in view of the cut-out 11 or sometimes from the unfavorable arrangement of the circuit through which it must pass. Now, the cut-out 7 is so proportioned as to operate upon a normal load current. Accordingly, the terminals of the said cut-out are separated when the normal current flows through the path last described, and thus permanently opening the circuit of the magnet 12 which remains out of operation.

Should the alternating current voltage fall for any cause, the apparatus will go out and the switch coil 14 controlling the switch 13 will open, preventing a discharge of the battery through the circuit of the coil 12. The restoration of the alternating current electro-motive-force will cause the apparatus to start up again as already described.

Instead of the storage battery 8 we may have any work circuit containing a counter electro-motive-force; for example, the work circuit supplied from several sources in parallel to the converter 1 when the converter 1 should stop acting for any reason it will start in the manner already described, or a motor may be substituted for the storage battery 8, it being understood that the converter will not start except when the motor is so energized as to have a counter electromotive-force.

The coil 6 may be placed between the storage battery 8 and the cut-out 7, if so desired. The magnet coil 14 with its switch 13 may be omitted and a hand switch may be substituted, if so desired.

It is not necessary that the magnet coil 12 be connected as shown between the electrodes 4 and 5, it being merely necessary that it be so excited and controlled that two consecutive connections between 4 and 5 be accomplished during the starting of the device. The cut-out 11 may be placed in the circuit 16—17, if desired.

I have found the result may be very neatly and satisfactorily accomplished by a careful adjustment of the stops and the tilting magnet and by so controlling the motion of the container that two or more rapidly recurring connections occur between the electrodes 4 and 5, with one motion of the container which result may be obtained by causing the stopping to be abrupt. When the main circuit is closed the storage battery sending current through the magnet 12 causes a tilting of the container 1 sufficient to bring into contact the mercury constituting the electrodes 4 and 5. Thereupon a circuit is formed which includes the said electrodes, the inductance 6 and the magnets 7 and 12. By reason of the action of the magnet 7 the cut-out 11 is operated so as to break this circuit which, however, is momentarily restored by the demagnetization of the magnet 7. During this action the mercury at the electrode 5 has been acting as a negative electrode with relation to the mercury constituting the electrode 4. The rupture of the circuit of the magnet 12 has, however, caused a separation of the electrodes 4 and 5 while the restoration of the circuit again causes contact between the said electrodes followed as before by an immediate separation thereof. Under these circumstances, the rupture between the mercury electrodes 4 and 5 constitutes the electrode 4 a negative electrode and starts the apparatus into operation in the proper way. Consequently, the magnet 7 remains energized and the shunt circuit hereinbefore described is permanently held open during the operation of the apparatus. Meanwhile, the negative electrode resistance having been broken down, current may flow through the converter in the usual way from positive electrodes 2 and 3 to the negative electrode 4.

In a divisional application filed September 24th, 1909, Serial Number 519,380, claims are made to the apparatus disclosed in the present application.

I claim as my invention:—

The method of starting a vapor electric rectifier characterized by and supplying a receiving circuit containing a source of counter electromotive force which consists in initiating a flow of current in the rectifier in a direction opposite to the normal direction and utilizing the cathode activity thus produced to overcome the starting resistance of the normal cathode.

Signed at New York, in the county of New York, and State of New York, this 8th day of May A. D. 1905.

PERCY H. THOMAS.

Witnesses:
WM. H. CAPEL,
GEORGE H. STOCKTON, Jr.